US011108051B2

(12) United States Patent
Chen et al.

(10) Patent No.: US 11,108,051 B2
(45) Date of Patent: Aug. 31, 2021

(54) MODIFIED POSITIVE ELECTRODE ACTIVE MATERIAL, PREPARATION METHOD THEREFOR AND ELECTROCHEMICAL ENERGY STORAGE DEVICE

(71) Applicant: CONTEMPORARY AMPEREX TECHNOLOGY CO., LIMITED, Ningde (CN)

(72) Inventors: Yujun Chen, Ningde (CN); Xinliang Kuang, Ningde (CN); Long Wang, Ningde (CN); Na Liu, Ningde (CN); Huan Ni, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 57 days.

(21) Appl. No.: 15/968,654

(22) Filed: May 1, 2018

(65) Prior Publication Data
US 2018/0323436 A1 Nov. 8, 2018

(30) Foreign Application Priority Data
May 5, 2017 (CN) .......................... 201710311741.5

(51) Int. Cl.
H01M 4/62 (2006.01)
H01M 4/36 (2006.01)
(Continued)

(52) U.S. Cl.
CPC ............. *H01M 4/628* (2013.01); *B01J 13/08* (2013.01); *H01M 4/0404* (2013.01);
(Continued)

(58) Field of Classification Search
CPC ..... H01M 4/62–628; H01M 4/36–366; H01M 4/525; H01M 4/505; H01M 10/0525; B01J 13/08
See application file for complete search history.

(56) References Cited

U.S. PATENT DOCUMENTS

| 6,878,487 | B2 * | 4/2005 | Cho ...................... | H01M 4/366 |
| | | | | 29/623.5 |
| 8,808,916 | B2 * | 8/2014 | Kim ...................... | H01M 4/525 |
| | | | | 429/231.1 |

(Continued)

FOREIGN PATENT DOCUMENTS

| CN | 101308925 A | 11/2008 |
| CN | 103887508 A | 6/2014 |

(Continued)

OTHER PUBLICATIONS

Contemporary Amperex Technology Co. Ltd., First Office Action, CN201710311741.5, dated Oct. 28, 2019, 7 pgs.

(Continued)

*Primary Examiner* — Karie O'Neill Apicella
(74) *Attorney, Agent, or Firm* — Morgan, Lewis & Bockius LLP

(57) ABSTRACT

The present disclosure provides a modified positive electrode active material. The modified positive electrode active material comprises a positive electrode active material inner core; a metal oxide layer comprising a metal oxide and coated on a surface of the positive electrode active material inner core; and a polymer layer comprising a polymer and coated on a surface of the metal oxide layer, the polymer being one or more selected from a group consisting of polyacrylic acid, polymethyl methacrylate, polyacrylamide and lithium polyacrylate. The modified positive electrode active material of the present disclosure has better structure stability and thermal stability, when the modified positive (Continued)

electrode active material is applied in the electrochemical energy storage device, cycle performance and safety performance of the electrochemical energy storage device can be significantly improved without decreasing energy density of the electrochemical energy storage device.

12 Claims, 1 Drawing Sheet

(51) Int. Cl.
  *H01M 4/525*  (2010.01)
  *B01J 13/08*  (2006.01)
  *H01M 10/0525*  (2010.01)
  *H01M 4/505*  (2010.01)
  *H01M 4/04*  (2006.01)
  *H01M 4/1391*  (2010.01)
  *H01M 4/131*  (2010.01)
  *H01M 4/02*  (2006.01)

(52) U.S. Cl.
  CPC ......... *H01M 4/0471* (2013.01); *H01M 4/131* (2013.01); *H01M 4/1391* (2013.01); *H01M 4/366* (2013.01); *H01M 4/505* (2013.01); *H01M 4/525* (2013.01); *H01M 4/622* (2013.01); *H01M 4/624* (2013.01); *H01M 10/0525* (2013.01); *H01M 2004/028* (2013.01)

(56) References Cited

U.S. PATENT DOCUMENTS

| | | | |
|---|---|---|---|
| 2010/0075226 A1* | 3/2010 | Pham | ................ H01M 4/134 429/219 |
| 2015/0188144 A1 | 7/2015 | Shin et al. | |
| 2016/0164078 A1* | 6/2016 | Hong | ................ H01M 10/052 429/217 |

FOREIGN PATENT DOCUMENTS

| | | | | |
|---|---|---|---|---|
| CN | 104617286 A | 5/2015 | | |
| CN | 104752728 A | 7/2015 | | |
| CN | 103078081 B | 4/2016 | | |
| EP | 2403041 A1 | 1/2012 | | |
| WO | WO-2013081245 A1 * | 6/2013 | ............ | H01M 4/622 |
| WO | WO2017/008284 A1 | 1/2017 | | |

OTHER PUBLICATIONS

Contemporary Amperex Technology Co. Ltd., Extended European Search Report, EP18170032.9, dated Aug. 28, 2018, 7 pgs.

* cited by examiner

MODIFIED POSITIVE ELECTRODE ACTIVE MATERIAL, PREPARATION METHOD THEREFOR AND ELECTROCHEMICAL ENERGY STORAGE DEVICE

CROSS-REFERENCE TO RELATED APPLICATIONS

The present application claims priority to Chinese patent application No. CN201710311741.5, filed on May 5, 2017, which is incorporated herein by reference in its entirety.

FIELD OF THE PRESENT DISCLOSURE

The present disclosure relates to the field of energy storage device, and more specifically relates to a modified positive electrode active material, a preparation method therefor and an electrochemical energy storage device.

BACKGROUND OF THE PRESENT DISCLOSURE

At present, in a power battery with high energy density and high capacity, a positive electrode active material is usually selected from $Li(Ni_xCo_yMn_{1-x-y})O_2$ based lithium multi-element transition metal oxide materials, which have advantages of low price, simple synthesis process, high specific capacity, and these materials have better safety performance than the traditional $LiCoO_2$ and $LiFePO_4$, and are considered to be the most likely new type positive electrode active material to replace $LiCoO_2$ and $LiFePO_4$, at present there are commercial products of varieties of these positive electrode active material are used in the lithium-ion battery, and are partially used in hybrid electric vehicle. However, there are also some problems with such materials, such as swelling of the lithium-ion battery under high voltage; loss of electrochemical activity of the positive electrode active material after too many cycles; safety issues of the lithium-ion battery under overcharge or thermal runaway, and the like.

Surface coating can be used to improve surface structure stability of the positive electrode active material and improve cycle performance of the lithium-ion battery under high voltage. Many literatures and patents in domestic and overseas have reported that a metal oxide such as $Al_2O_3$, $ZrO_2$, $TiO_2$ and the like is used to coat the positive electrode active material. However, the single metal oxide layer is not enough to cover the positive electrode active material uniformly and effectively, thereby limiting the effect of the coating. At the same time, the metal oxide is a non-electrochemically active material with poor lithium ion-conducting property, which will decrease the specific capacity and discharge voltage platform of the positive electrode active material after coating, thereby reducing the energy density of the positive electrode active material to a certain extent.

SUMMARY OF THE PRESENT DISCLOSURE

In view of the problems existing in the background, an object of the present disclosure is to provide a modified positive electrode active material, a preparation method therefor and an electrochemical energy storage device, the modified positive electrode active material has better structure stability and thermal stability, when the modified positive electrode active material is applied to the electrochemical energy storage device, cycle performance and safety performance of the electrochemical energy storage device can be significantly improved without decreasing energy density of the electrochemical energy storage device.

In order to achieve the above objects, in a first aspect of the present disclosure, the present disclosure provides an modified positive electrode active material, which comprises: a positive electrode active material inner core; a metal oxide layer comprising a metal oxide and coated on a surface of the positive electrode active material inner core; and a polymer layer comprising a polymer and coated on a surface of the metal oxide layer. The polymer is one or more selected from a group consisting of polyacrylic acid, polymethyl methacrylate, polyacrylamide and lithium polyacrylate.

In a second aspect of the present disclosure, the present disclosure provides a preparation method of a modified positive electrode active material for preparing the modified positive electrode active material of the first aspect of the present disclosure, which comprises steps of: (1) dissolving a positive electrode active material inner core in a solvent to form a suspension, then adding a salt solution of metal element into the suspension and stirring to react, after the reaction, filtering, drying and calcining to make a metal oxide layer coated on a surface of the positive electrode active material inner core; (2) dissolving a polymer in a solvent and then adding the substance obtained in the step (1), stirring to react, after the reaction, standing-by and taking underlayer solid material to dry, then calcining under a protective gas to make the polymer coated on a surface of the metal oxide layer to form a polymer layer and obtain the modified positive electrode active material, the polymer is one or more selected from a group consisting of polyacrylic acid, polymethyl methacrylate, polyacrylamide and lithium polyacrylate.

In a third aspect of the present disclosure, the present disclosure provides an electrochemical energy storage device, which comprises the modified positive electrode active material according to the first aspect of the present disclosure.

Compared to the technologies in the background, the present disclosure has the following beneficial effects: the modified positive electrode active material of the present disclosure has better structure stability and thermal stability, when the modified positive electrode active material is applied in the electrochemical energy storage device, cycle performance and safety performance of the electrochemical energy storage device can be significantly improved without decreasing energy density of the electrochemical energy storage device.

DETAILED DESCRIPTION

Figure 1:
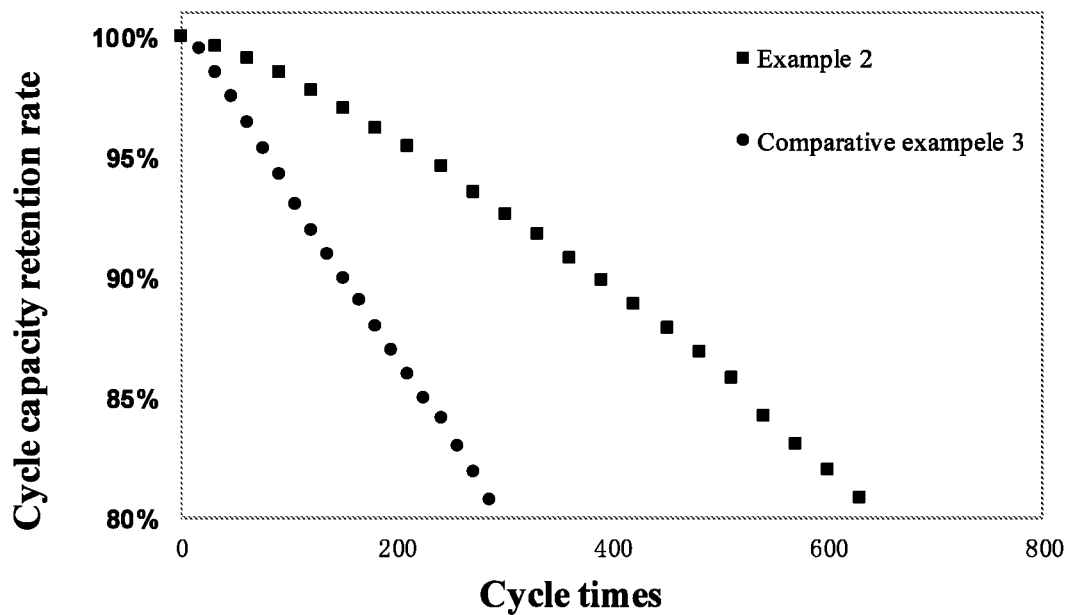
FIG. 1 illustrated 1C/1C cyclic curves of example 2 and comparative example 3.

Hereinafter a modified positive electrode active material, a preparation method therefor and an electrochemical energy storage device according to the present disclosure are described in detail.

Firstly, a modified positive electrode active material according to a first aspect of the present disclosure is described.

The modified positive electrode active material according to the first aspect of the present disclosure comprises a positive electrode active material inner core, a metal oxide layer and a polymer layer. The metal oxide layer comprises a metal oxide and is coated on a surface of the positive electrode active material inner core. The polymer layer comprises a polymer and is coated on a surface of the metal oxide layer. The polymer is one or more selected from a group consisting of polyacrylic acid, polymethyl methacrylate, polyacrylamide and lithium polyacrylate (PAALi).

In the modified positive electrode active material according to the first aspect of the present disclosure, the metal oxide layer and the polymer layer can be effectively, uniformly and stably coated on the surface of the positive electrode active material inner core, so as to isolate the positive electrode active material inner core from an electrolyte and prevent side reactions between the positive electrode active material inner core and the electrolyte from occurring. Especially when the electrochemical energy storage device is operated under high voltage, cycle performance and safety performance of the electrochemical energy storage device under high voltage can be significantly improved due to the modified positive electrode active material having the coated metal oxide layer and polymer layer. The polymer layer can promote ion transport, which can avoid the loss of specific capacity of the positive electrode active material inner core and prevent energy density of the electrochemical energy storage device from decreasing. Moreover, it can maintain better adhesive property between the metal oxide layer and the positive electrode active material inner core, so as to ensure stability of the metal oxide layer and polymer layer, and effectively prevent adhesive property between the metal oxide layer and the positive electrode active material inner core from decreasing during cycle process of the electrochemical energy storage device, and maintain better electrical contact between the metal oxide layer and the positive electrode active material inner core, thereby improving the cycle performance and safety performance under high voltage of the electrochemical energy storage device.

In the modified positive electrode active material according to the first aspect of the present disclosure, preferably, the polymer is selected from lithium polyacrylate, the lithium polyacrylate contains lithium, which will contribute to ion transport after forming a coating layer, thereby ion transport can be further increased, avoiding the loss of specific capacity of the positive electrode active material inner core and avoiding decreasing energy density of the electrochemical energy storage device.

In the modified positive electrode active material according to the first aspect of the present disclosure, a metal element of the metal oxide is one or more selected from a group consisting of Al, Mg, Ti, Sn, Si and Zr.

In the modified positive electrode active material according to the first aspect of the present disclosure, a total content of the metal oxide layer and the polymer layer may be 0.1%~3% of a mass of the positive electrode active material inner core. When the content is less than 0.1%, the positive electrode active material inner core cannot be effectively isolated from the electrolyte by the metal oxide layer and the polymer layer due to such a less content, thereby performance of the electrochemical energy storage device cannot be improved obviously; when the content is more than 3%, specific capacity of the positive electrode active material inner core will be affected, and energy density of the electrochemical energy storage device will be decreased.

In the modified positive electrode active material according to the first aspect of the present disclosure, a content of the metal oxide layer may be 0.04%~1.4% of the mass of the positive electrode active material inner core, preferably, the content of the metal oxide layer may be 0.1%~0.3% of the mass of the positive electrode active material inner core.

In the modified positive electrode active material according to the first aspect of the present disclosure, a content of the polymer layer may be 0.06%~1.6% of the mass of the positive electrode active material inner core, preferably, the content of the polymer layer may be 0.1%~0.2% of the mass of the positive electrode active material inner core.

In the modified positive electrode active material according to the first aspect of the present disclosure, the positive electrode active material inner core is one or more selected from a group consisting of $LiCoO_2$, $Li(Ni_xCo_yMn_{1-x-y})O_2$, $LiNiO_2$, $LiMn_2O_4$, $LiNi_{0.5}Mn_{1.5}O_4$ and $LiFePO_4$, where, $0<x<1$, $0<y<1$, $0<x+y<1$.

Secondly, a preparation method of the modified positive electrode active material according to a second aspect of the present disclosure is described.

The preparation method of the modified positive electrode active material according to the second aspect of the present disclosure for preparing the modified positive electrode active material of the first aspect of the present disclosure, comprises steps of: (1) dissolving the positive electrode active material inner core in a solvent to form a suspension, then adding a salt solution of metal element into the suspension and stirring to react, after the reaction, filtering, drying and calcining to make a metal oxide layer coated on a surface of the positive electrode active material inner core; (2) dissolving the polymer in a solvent and then adding the substance obtained in step (1), stirring to react, after the reaction, standing-by and taking underlayer solid material to dry, then calcining under a protective gas to make the polymer coated on a surface of the metal oxide layer and form a polymer layer and obtain the modified positive electrode active material, in which, the polymer is one or more selected from a group consisting of polyacrylic acid, polymethyl methacrylate, polyacrylamide and lithium polyacrylate.

In the preparation method of the modified positive electrode active material according to the second aspect of the present disclosure, in the step (1), the solvent may be a mixed solution formed by water with one or more selected from a group consisting of ammonia, carbamide, glycerol, propylene glycol, ethylene glycol, etanol, 1-propanol, isopropanol and acetone.

In the preparation method of the modified positive electrode active material according to the second aspect of the present disclosure, in the step (1), the salt solution of the metal element may be sulfate, nitrate, or alkoxide solution of the metal element (such as Al, Mg, Ti, Sn, Si, Zr), such as aluminum sulfate, aluminium isopropoxide or tetrabutyl titanate.

In the preparation method of the modified positive electrode active material according to the second aspect of the present disclosure, in the step (1), the reaction temperature may be 45° C.~90° C., the stirring speed may be 60 rpm~180 rpm, the stirring time may be 30 min~180 min.

In the preparation method of the modified positive electrode active material according to the second aspect of the present disclosure, in the step (1), vacuum drying is taken, the drying temperature may be 60° C.~150° C.

In the preparation method of the modified positive electrode active material according to the second aspect of the present disclosure, in the step (1), the calcining temperature may be 200° C.~600° C., the calcining time may be 1 h~10 h.

In the preparation method of the modified positive electrode active material according to the second aspect of the present disclosure, in the step (2), the solvent may be one or more selected from a group consisting of water, 1-methyl-2-pyrrolidinone, N,N-Dimethylformamide, etanol, 1-propanol and isopropanol.

In the preparation method of the modified positive electrode active material according to the second aspect of the present disclosure, in the step (2), the stirring speed may be 60 rpm~180 rpm, the stirring time may be 0.5 h~3 h, the standing-by time may be 6 h~24 h; the drying temperature may be 60° C.~150° C.

In the preparation method of the modified positive electrode active material according to the second aspect of the present disclosure, in the step (2), the protective gas may be one or more selected from a group consisting of helium, argon, nitrogen.

In the preparation method of the modified positive electrode active material according to the second aspect of the present disclosure, in the step (2), the calcining temperature may be 200° C.~400° C., the calcination time may be 2 h~5 h. The calcining temperature should not be too high, otherwise the polymer layer will be easily carbonized.

In the preparation method of the modified positive electrode active material according to the second aspect of the present disclosure, in the step (2), cooling to room temperature is then performed after calcining, which is followed by feeding out. The cooling method may be natural cooling.

Next, an electrochemical energy storage device according to a third aspect of the present disclosure is described.

The electrochemical energy storage device according to the third aspect of the present disclosure comprises the modified positive electrode active material according to the first aspect of the present disclosure.

In the electrochemical energy storage device according to the third aspect of the present disclosure, the electrochemical energy storage device comprises a positive electrode plate, a negative electrode plate, a separator and an electrolyte. The positive electrode plate comprises a positive electrode current collector and a positive electrode film provided on the positive electrode current collector, the positive electrode film comprises the modified positive electrode active material according to the first aspect of the present disclosure.

In the electrochemical energy storage device according to the third aspect of the present disclosure, the electrochemical energy storage device may be a supercapacitor, a lithium-ion battery or a sodium-ion battery. In the examples, the illustrated secondary battery is a lithium-ion secondary battery, but the present disclosure is not limited to this.

In the lithium-ion battery, the positive electrode current collector is an aluminum foil. Positive electrode conductive agent may be one or more selected from a group consisting of acetylene black, conductive carbon black (Super P, Super S, 350G), carbon fibre (VGCF), carbon nanotube (CNT) and ketjenblack.

In the lithium-ion battery, the negative electrode plate comprises a negative electrode current collector and a negative electrode film provided on the negative electrode current collector. The negative electrode current collector is a copper foil. Negative electrode active material is selected from artificial graphite or natural graphite. Negative electrode conductive agent is one or more selected from a group consisting of acetylene black, conductive carbon black (Super P, Super S, 350G), carbon fibre (VGCF), carbon nanotube (CNT) and ketjenblack.

In the lithium-ion battery, the electrolyte may be liquid electrolyte, the electrolyte may comprise a lithium salt and an organic solvent.

In the lithium-ion battery, the specific type of the lithium salt is not limited. Specifically, the lithium salt may be one or more selected from a group consisting of $LiPF_6$, $LiBF_4$, $LiN(SO_2F)_2$ (abbreviated as LiFSI), $LiN(CF_3SO_2)_2$ (abbreviated as LiTFSI), $LiClO_4$, $LiAsF_6$, $LiB(C_2O_4)_2$ (abbreviated as LiBOB) and $LiBF_2C_2O_4$ (abbreviated as LiDFOB).

In the lithium-ion battery, the specific type of the organic solvent is not especially limited and may be changed as desired. Preferably, the organic solvent may be non-aqueous organic solvent. The non-aqueous organic solvent may comprise any type of carbonate ester and/or carboxylate ester. The non-aqueous organic solvent may further comprise halogenated carbonate ester. Specifically, the organic solvent may be one or more selected from a group consisting of ethylene carbonate (EC), propylene carbonate (PC), butylene carbonate, pentylene carbonate, fluoroethylene carbonate, dimethyl carbonate, diethyl carbonate (DEC), dipropyl carbonate, ethyl methyl carbonate, γ-butyrolactone, methyl formate, ethyl formate, ethyl propionate, propyl propionate and tetrahydrofuran.

In the lithium-ion battery, the type of the separator is not specifically limited and may be changed as desired.

Hereinafter the present disclosure will be described in detail in combination with examples. It should be noted that, the examples described in the present disclosure are only used for explaining the present disclosure, and are not intended to limit the present disclosure. In the examples, the illustrated energy storage device is a lithium-ion secondary battery, but the present disclosure is not limited to that.

In the following example, the reagents, materials and instruments used are commercially available without special instructions.

Example 1

(1) Preparation of the modified positive electrode active material: firstly, 150 g of ammonium hydroxide with a concentration of 1 mol/L was prepared in a beaker, stirring was then performed by a magnetic stirrer after a magnetic stir bar was put into the beaker, the stirring speed was 150 rpm, then 100 g of commercial $Li(Ni_{0.6}Co_{0.2}Mn_{0.2})O_2$ powders were added, a suspension was obtained; next 19.6 mL of aluminum sulfate solution with a concentration of 0.05 mol/L was slowly added in, which was followed by stirring for 1 h at the stirring speed of 150 rpm, then filtering was performed, which was followed by vacuum drying at 85° C. for 12 h; finally the dried sample was calcined for 6 h at 400° C., so as to make the aluminum oxide ($Al_2O_3$) coated on the surface of the $Li(Ni_{0.6}Co_{0.2}Mn_{0.2})O_2$. 80 g of PAALi solution with a concentration of 1000 ppm was prepared in a beaker containing deionized water, then stirring was performed by a magnetic stirrer after putting into a magnetic stir bar, meanwhile 44 g of the above obtained $Li(Ni_{0.6}Co_{0.2}Mn_{0.2})O_2$ coated with $Al_2O_3$ was added in and stirred for 2 h, when the stirring was finished, the magnetic stir bar was taken out, the suspension was stood-by for 10 h, then the supernatant liquid was poured out, the underlayer solid material was dried under vacuum at 85° C. for 24 h, then it was calcined at 300° C. under nitrogen for 4 h, after naturally cooled to room temperature, the modified positive electrode active material was obtained, that was, Li($Ni_{0.6}Co_{0.2}Mn_{0.2}$)$O_2$ double-coated with PAALi layer and $Al_2O_3$ layer, where, based on a mass of Li($Ni_{0.6}Co_{0.2}Mn_{0.2}$)$O_2$, a content of the PAALi layer was 0.18%, a content of the $Al_2O_3$ layer was 0.1%.

(2) Preparation of the positive electrode plate: the above modified positive electrode active material, Super P (positive electrode conductive agent) and polyvinylidene fluoride (PVDF, binder) at a mass ratio of 97:2:1 were uniformly mixed with 1-methyl-2-pyrrolidinone (NMP, solvent) to form a positive electrode slurry, then the positive electrode slurry was uniformly coated on an aluminum foil (positive electrode current collector) with a thickness of 12 μm, drying was then performed at 85° C., which was followed by cold pressing, then after edge-trimming, slicing, slitting, drying at 85° C. for 4 h under vacuum and welding an electrode tab, the preparation of the positive electrode plate was finished.

(3) Preparation of the negative electrode plate: graphite (negative electrode active material), Super P (negative electrode conductive agent), CMC (thickening agent) and SBR (binder) at a mass ratio of 97:1:1:1 were uniformly mixed with deionized water (solvent) to form a negative electrode slurry, then the negative electrode slurry was uniformly coated on a copper foil (negative current collector), drying was then performed at 85° C., which was followed by cold pressing, then after edge-trimming, slicing, slitting, drying at 110° C. for 4 h under vacuum and welding an electrode tab, the required negative electrode plate was obtained.

(4) Preparation of the electrolyte: in an argon atmosphere glove box in which the water content was less than 0 ppm, ethylene carbonate (EC), propylene carbonate (PC) and diethyl carbonate (DEC) at a volume ratio of EC:PC:DEC=1:1:1 were mixed, then the fully dried lithium salt $LiPF_6$ was dissolved into the mixed organic solvent, after uniformly mixing, the electrolyte was obtained, where, a concentration of the $LiPF_6$ was 1M.

(5) Preparation of the separator: a polypropylene film was used as the separator.

(6) Preparation of the lithium-ion battery: the positive electrode plate, the separator, the negative electrode plate were laminated to make the separator separate the positive electrode plate from the negative electrode plate, then were wound to form an electrode assembly and placed in a package case, then the prepared electrolyte was injected, after sealing, standing-by, forming, shaping, capacity testing, the preparation of the lithium-ion battery was finished.

Example 2

The preparation was the same as example 1, except that in the preparation of the modified positive electrode active material (step (1)), the amount of the aluminum sulfate solution was 39.2 mL, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 0.18%, a content of the $Al_2O_3$ layer was 0.2%.

Example 3

The preparation was the same as example 1, except that in the preparation of the modified positive electrode active material (step (1)), the amount of the aluminum sulfate solution was 58.8 mL, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 0.18%, a content of the $Al_2O_3$ layer was 0.3%.

Example 4

The preparation was the same as example 1, except that in the preparation of the modified positive electrode active material (step (1)), the amount of the aluminum sulfate solution was 268 mL, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 0.18%, a content of the $Al_2O_3$ layer was 1.4%.

Example 5

The preparation was the same as example 1, except that in the preparation of the modified positive electrode active material (step (1)), the amount of the aluminum sulfate solution was 7.7 mL, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 0.18%, a content of the $Al_2O_3$ layer was 0.04%.

Example 6

The preparation was the same as example 1, except that in the preparation of the modified positive electrode active material (step (1)), 27 g of PAALi solution with a concentration of 1000 ppm was prepared in a beaker containing deionized water, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 0.06%, a content of the $Al_2O_3$ layer was 0.1%.

Example 7

The preparation was the same as example 1, except that in the preparation of the modified positive electrode active material(step (1)), 700 g of PAALi solution with a concentration of 1000 ppm was prepared in a beaker containing deionized water, in the obtained Li($Ni_{0.6}Co_{0.2}Mn_{0.2}$)$O_2$ double-coated with PAALi layer and $Al_2O_3$ layer, based on a mass of Li($Ni_{0.6}Co_{0.2}Mn_{0.2}$)$O_2$, a content of the PAALi layer was 1.6%, a content of the $Al_2O_3$ layer was 0.1%.

Example 8

The preparation was the same as example 1, except that in the preparation of the modified positive electrode active material (step (1)), firstly, 150 g of absolute ethanol was added into a beaker, stirring was then performed by a magnetic stirrer after a magnetic stir bar was put into the beaker, the stirring speed was 150 rpm, then 100 g commercial Li($Ni_{0.6}Co_{0.2}Mn_{0.2}$)$O_2$ powders were add in, a suspension was obtained; next 0.43 g of tetrabutyl titanate was added, which was followed by stirring for 1 h at a stirring speed of 150 rpm, then filtering was performed, which was followed by vacuum drying at 85° C. for 12 h; finally the dried sample was calcined for 6 h at 400° C., so as to make the titanium oxide ($TiO_2$) coated on the surface of the Li($Ni_{0.6}Co_{0.2}Mn_{0.2}$)$O_2$. 80 g of PAALi solution with a concentration of 1000 ppm was prepared in a beaker containing deionized water, then stirring was performed by a magnetic stirrer after putting into a magnetic stir bar, meanwhile 44 g of the above obtained Li($Ni_{0.6}Co_{0.2}Mn_{0.2}$)$O_2$ coated with $TiO_2$ was added into and stirred for 2 h, when the stirring was finished, the magnetic stir bar was taken out, the suspension was stood-by for 10 h, then the supernatant liquid was poured out, the underlayer solid material was dried under vacuum at 85° C. for 24 h and then calcined at 300° C. under nitrogen for 4 h, after naturally cooled to room temperature, the modified positive electrode active material was obtained, that was, Li(Ni$_{0.6}$Co$_{0.2}$Mn$_{0.2}$)O$_2$ double-coated with PAALi layer and TiO$_2$ layer, where, based on a mass of Li(Ni$_{0.6}$Co$_{0.2}$Mn$_{0.2}$)O$_2$, a content of the PAALi layer was 0.18%, a content of the TiO$_2$ layer was 0.1%.

Example 9

The preparation was the same as example 1, except that in the preparation of the modified positive electrode active material (step (1)), the commercial Li(Ni$_{0.6}$Co$_{0.2}$Mn$_{0.2}$)O$_2$ was replaced by commercial Li(Ni$_{0.8}$Co$_{0.1}$Mn$_{0.1}$)O$_2$.

Comparative Example 1

The preparation was the same as example 1, except that in the preparation of the modified positive electrode active material (step (1)), firstly, 150 g of ammonium hydroxide with a concentration of 1 mol/L was prepared in a beaker, stirring was then performed by a magnetic stirrer after a magnetic stir bar was put into the beaker, a stirring speed was 150 rpm, then 100 g of commercial Li(Ni$_{0.6}$Co$_{0.2}$Mn$_{0.2}$)O$_2$ powders were added, a suspension was obtained; next 19.6 mL of aluminum sulfate solution with a concentration of 0.05 mol/L was slowly added into, which was followed by stirring for 1 h at a stirring speed of 150 rpm, then filtering was performed, which was followed by vacuum drying at 85° C. for 12 h; finally the dried sample was calcined for 6 h at 400° C., so as to make the aluminum oxide (Al$_2$O$_3$) coated on the surface of the Li(Ni$_{0.6}$Co$_{0.2}$Mn$_{0.2}$)O$_2$, where, based on a mass of Li(Ni$_{0.6}$Co$_{0.2}$Mn$_{0.2}$)O$_2$, a content of the Al$_2$O$_3$ layer was 0.1%.

Comparative Example 2

The preparation was the same as example 1, except that in the preparation of the modified positive electrode active material (step (1)), 80 g of PAALi solution with a concentration of 1000 ppm was prepared in a beaker containing deionized water, then stirring was performed by a magnetic stirrer after putting into a magnetic stir bar, meanwhile 44 g of Li(Ni$_{0.6}$Co$_{0.2}$Mn$_{0.2}$)O$_2$ powers were added and stirred for 2 h, when the stirring was finished, the magnetic stir bar was taken out, the suspension was stood-by for 10 h, then the supernatant liquid was poured out, the underlayer solid material was dried under vacuum at 85° C. for 24 h and then was calcined at 300° C. under nitrogen for 4 h, after naturally cooled to room temperature the modified positive electrode active material was obtained, that is, Li(Ni$_{0.6}$Co$_{0.2}$Mn$_{0.2}$)O$_2$ coated with PAALi layer, where, based on a mass of Li(Ni$_{0.6}$Co$_{0.2}$Mn$_{0.2}$)O$_2$, a content of the PAALi layer was 0.18%.

Comparative Example 3

The preparation was the same as example 1, except that the commercial Li(Ni$_{0.6}$Co$_{0.2}$Mn$_{0.2}$)O$_2$ powder was directly used as the positive electrode active material, and no coating layer was formed.

Comparative Example 4

The preparation was the same as example 1, except that in the preparation of the modified positive electrode active material (step (1)), the commercial Li(Ni$_{0.8}$Co$_{0.1}$Mn$_{0.1}$)O$_2$ powder was directly used as the positive electrode active material, and no coating layer was formed.

Comparative Example 5

The preparation was the same as example 1, except that in the preparation of the modified positive electrode active material (step (1)), the PAALi was replaced by polyvinylidene fluoride (PVDF).

Finally, test processes and test results of the lithium-ion secondary batteries were described.

(1) Testing of Cycle Performance of the Lithium-Ion Battery

At 45° C., the lithium-ion battery was charged to a voltage of 4.3V at a constant current of 1C, then the lithium-ion secondary battery was charged to current of 0.05C at a constant voltage of 4.3V, then the lithium-ion battery was discharged at a constant current of 1C until the final voltage was 2.8V, discharge capacity of the first cycle was recorded, then the cycle process was repeated, discharge capacity of each cycle of the lithium-ion battery was recorded, until the cycle capacity retention rate was decreased to 80%, cycle times at this time was recorded.

(2) Testing of Thermal Stability of the Lithium-Ion Battery

At 25° C., the lithium-ion battery was charged to a voltage of 4.3V at a constant current of 1C, then the lithium-ion battery was charged to a current of 0.05C at a constant voltage of 4.3V, then the lithium-ion battery was disassembled in a desiccation room, after the electrolyte completely volatilizing, the modified positive electrode active material was regained from the aluminum foil (positive electrode collector) of the positive electrode plate, and DSC test was performed, where, the heating rate was 10° C./min.

TABLE 1

Test results of cycle performance of examples 1-9 and comparative examples 1-5

| | Positive electrode active material inner core | Metal oxide | | Polymer | | Cycle times |
|---|---|---|---|---|---|---|
| | | Type | Content | Type | Content | |
| Example 1 | Li(Ni$_{0.6}$Co$_{0.2}$Mn$_{0.2}$)O$_2$ | Al$_2$O$_3$ | 0.10% | PAALi | 0.18% | 560 |
| Example 2 | Li(Ni$_{0.6}$Co$_{0.2}$Mn$_{0.2}$)O$_2$ | Al$_2$O$_3$ | 0.20% | PAALi | 0.18% | 650 |
| Example 3 | Li(Ni$_{0.6}$Co$_{0.2}$Mn$_{0.2}$)O$_2$ | Al$_2$O$_3$ | 0.30% | PAALi | 0.18% | 550 |
| Example 4 | Li(Ni$_{0.6}$Co$_{0.2}$Mn$_{0.2}$)O$_2$ | Al$_2$O$_3$ | 1.40% | PAALi | 0.18% | 510 |
| Example 5 | Li(Ni$_{0.6}$Co$_{0.2}$Mn$_{0.2}$)O$_2$ | Al$_2$O$_3$ | 0.04% | PAALi | 0.18% | 520 |
| Example 6 | Li(Ni$_{0.6}$Co$_{0.2}$Mn$_{0.2}$)O$_2$ | Al$_2$O$_3$ | 0.10% | PAALi | 0.06% | 515 |
| Example 7 | Li(Ni$_{0.6}$Co$_{0.2}$Mn$_{0.2}$)O$_2$ | Al$_2$O$_3$ | 0.10% | PAALi | 1.60% | 483 |

TABLE 1-continued

Test results of cycle performance of examples 1-9 and comparative examples 1-5

| | Positive electrode active material inner core | Metal oxide | | Polymer | | Cycle times |
|---|---|---|---|---|---|---|
| | | Type | Content | Type | Content | |
| Example 8 | $Li(Ni_{0.6}Co_{0.2}Mn_{0.2})O_2$ | $TiO_2$ | 0.10% | PAALi | 0.18% | 472 |
| Example 9 | $Li(Ni_{0.8}Co_{0.1}Mn_{0.1})O_2$ | $Al_2O_3$ | 0.10% | PAALi | 0.18% | 327 |
| Comparative example 1 | $Li(Ni_{0.6}Co_{0.2}Mn_{0.2})O_2$ | $Al_2O_3$ | 0.10% | / | / | 457 |
| Comparative example 2 | $Li(Ni_{0.6}Co_{0.2}Mn_{0.2})O_2$ | / | / | PAALi | 0.18% | 394 |
| Comparative example 3 | $Li(Ni_{0.6}Co_{0.2}Mn_{0.2})O_2$ | / | / | / | / | 295 |
| Comparative example 4 | $Li(Ni_{0.8}Co_{0.1}Mn_{0.1})O_2$ | / | / | / | / | 180 |
| Comparative example 5 | $Li(Ni_{0.6}Co_{0.2}Mn_{0.2})O_2$ | $Al_2O_3$ | 0.10% | PVDF | 0.18% | 496 |

It could be seen from Table 1, in examples 1-8 and comparative examples 1-3, when only polymer layer (PAALi) or metal oxide layer ($Al_2O_3$) was coated on the $Li(Ni_{0.6}Co_{0.2}Mn_{0.2})O_2$ in comparative examples 1-2, the cycle performance under high temperature and high voltage of the lithium-ion battery was not significantly improved. However, when $Li(Ni_{0.6}Co_{0.2}Mn_{0.2})O_2$ was double-coated with polymer layer and metal oxide layer as shown in examples 1-8, the cycle performance under high temperature and high voltage of the lithium-ion battery was significantly improved. Similarly, in example 9 and comparative example 4, $Li(Ni_{0.8}Co_{0.1}Mn_{0.1})O_2$ was double-coated with polymer layer and metal oxide layer, the cycle performance under high temperature and high voltage of the lithium-ion battery was significantly improved, cycle times of the lithium-ion battery were increased from 180 times to 327 times. Furthermore, it could be seen from examples 1-5, there was an optimal value of the content of the metal oxide layer; it could be seen from example 1, examples 6-7, there was an optimal value of the content of the polymer layer.

FIG. 1 illustrated cyclic curves of 1C/1C of example 2 and comparative example 3. It could be seen from FIG. 1, $Li(Ni_{0.6}Co_{0.2}Mn_{0.2})O_2$ double-coated with polymer layer and metal oxide layer was used in example 2, capacity retention rate curve of the lithium-ion battery was slowly decreased with the increasing of cycle times.

Figure 2:
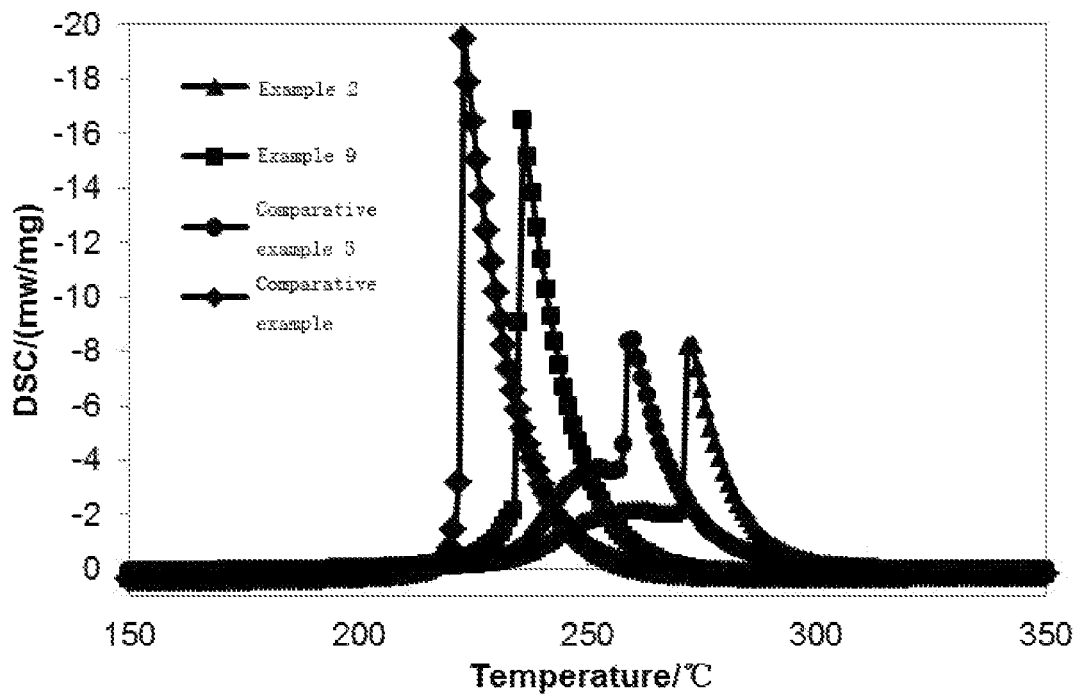
FIG. 2 illustrated DSC testing curves of example 2 and 9 and comparative examples 3 and 4.

FIG. 2 illustrated DSC testing curves of examples 2, 9 and comparative examples 3, 4. It could be seen from FIG. 2, compared with comparative example 3, $Li(Ni_{0.6}Co_{0.2}Mn_{0.2})O_2$ double-coated with polymer layer and metal oxide layer was used in example 2, position of DSC exothermic peak at full charge state was delayed obviously; comparing with comparative example 4, $Li(Ni_{0.8}Co_{0.1}Mn_{0.1})O_2$ double-coated with polymer layer and metal oxide layer was used in example 9, position of DSC exothermic peak at full charge state was delayed obviously; indicating that thermal stability of the modified positive electrode active material of the present disclosure was improved obviously, that was, safety performance of the lithium-ion battery was improved.

It could be seen from example 1 and comparative example 5, polymer layer of comparative example 5 was PVDF, polymer layer of example 1 was PAALi, since the PVDF did not have ability to conductive lithium ion, the cycle performance of the lithium-ion battery was not good.

What is claimed is:

1. A modified positive electrode active material, comprising:
   a positive electrode active material inner core;
   a metal oxide layer comprising a metal oxide coated on a surface of the positive electrode active material inner core, a metal element of the metal oxide being one or more selected from the group consisting of Al, Mg, Ti, Sn, Si and Zr; and
   a polymer layer comprising a polymer coated on a surface of the metal oxide layer, the polymer being lithium polyacrylate,
   wherein the content of the metal oxide layer is 0.1%~0.3% of the mass of the positive electrode active material inner core.

2. The modified positive electrode active material according to claim 1, wherein a total content of the metal oxide layer and the polymer layer is 0.1%~3% of a mass of the positive electrode active material inner core.

3. The modified positive electrode active material according to claim 2, wherein a content of the metal oxide layer is 0.04%~1.4% of the mass of the positive electrode active material inner core.

4. The modified positive electrode active material according to claim 2, wherein a content of the polymer layer is 0.06%~1.6% of the mass of the positive electrode active material inner core.

5. The modified positive electrode active material according to claim 4, wherein the content of the polymer layer is 0.1%~0.2% of the mass of the positive electrode active material inner core.

6. The modified positive electrode active material according to claim 1, wherein the positive electrode active material inner core is one or more selected from a group consisting of $LiCoO_2$, $Li(Ni_xCo_yMn_{1-x-y})O_2$, $LiNiO_2$, $LiMn_2O_4$, $LiNi_{0.5}Mn_{1.5}O_4$ and $LiFePO_4$, where, $0<x<1$, $0<y<1$, $0<x+y<1$.

7. An electrochemical energy storage device, comprising a modified positive electrode active material;
   the modified positive electrode active material comprising:
   a positive electrode active material inner core;
   a metal oxide layer comprising a metal oxide coated on a surface of the positive electrode active material inner core, a metal element of the metal oxide being one or more selected from the group consisting of Al, Mg, Ti, Sn, Si and Zr; and a polymer layer comprising a polymer coated on a surface of the metal oxide layer, the polymer being lithium polyacrylate, wherein the content of the metal oxide layer is 0.1%~0.3% of the mass of the positive electrode active material inner core.

8. The electrochemical energy storage device according to claim 7, wherein a total content of the metal oxide layer and the polymer layer is 0.1%~3% of a mass of the positive electrode active material inner core.

9. The electrochemical energy storage device according to claim 8, wherein a content of the metal oxide layer is 0.04%~1.4% of the mass of the positive electrode active material inner core.

10. The electrochemical energy storage device according to claim 8, wherein a content of the polymer layer is 0.06%~1.6% of the mass of the positive electrode active material inner core.

11. The electrochemical energy storage device according to claim 10, wherein the content of the polymer layer is 0.1%~0.2% of the mass of the positive electrode active material inner core.

12. The electrochemical energy storage device according to claim 7, wherein the positive electrode active material inner core is one or more selected from a group consisting of $LiCoO_2$, $Li(Ni_xCo_yMn_{1-x-y})O_2$, $LiNiO_2$, $LiMn_2O_4$, $LiNi_{0.5}Mn_{1.5}O_4$ and $LiFePO_4$, where, $0<x<1$, $0<y<1$, $0<x+y<1$.

* * * * *